D. Homer,
Horseshoe.
N° 2,564.      Patented Apr. 16, 1842.
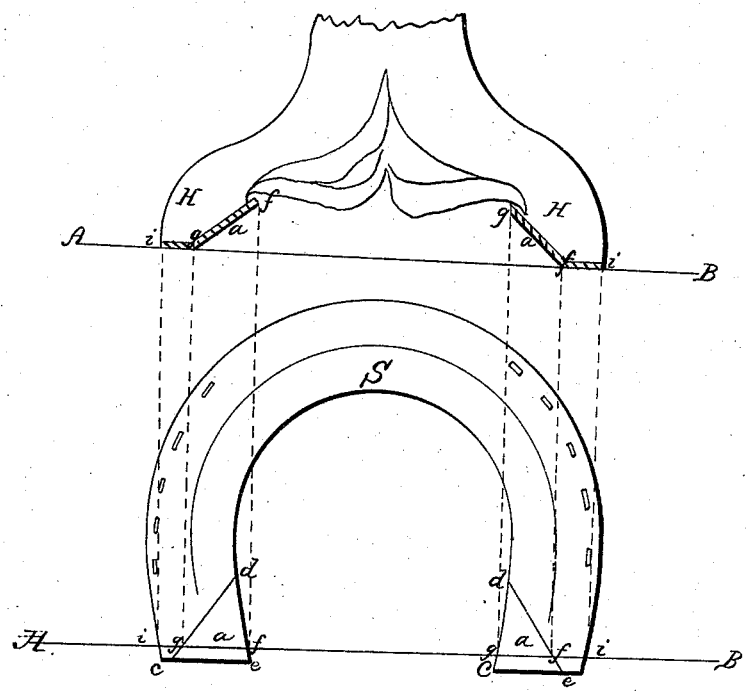
Witnesses;
Geo. W. Lory
Inventor;
Daniel x Homer
his mark

UNITED STATES PATENT OFFICE.

DANIEL HOMER, OF ALTON, ILLINOIS.

IMPROVEMENT IN HORSESHOES FOR THE RELIEF AND CURE OF HOOF-BOUND HORSES.

Specification forming part of Letters Patent No. 2,564, dated April 16, 1842.

*To all whom it may concern:*

Be it known that I, DANIEL HOMER, of Alton, in the county of Madison and State of Illinois, have invented an Improvement in the Horseshoe for the Relief and Cure of Hoof-Bound Horses; and I do hereby declare that the following is a full and exact description of my improvement.

This invention consists in turning the inner parts of the heel of the shoe upward into the hoof of the animal, so that the shell or horny part thereof shall rest upon the inclined surface of the elevated portion, and thereby cause to open or spread the heel of the foot, which had become so contracted as to pinch and cramp the frog and create soreness and consequent lameness, which has been known and denominated "hoof-bound" disease or complaint.

S in the accompanying drawing represents the shoe with the parts $c\ d\ e$ turned upward, as is shown by the aid of the vertical section on the line A B. $i\ g\ f$ show the sections in horizontal and vertical projections cut by the plane A B. $g\ f$ is the part turned up, presenting the surface $a$ or $c\ d\ e$ inclining outward, so that the shell of the hoof H rests upon it, which, by the weight of the animal, readily spreads the hoof and affords effectually the relief desired. The shoe in other respects is the same as that in ordinary use. It may be used with a calk, either welded or riveted on.

A slight twist of the heels of shoes has been practiced, differing from my invention or improvement in effect as well as in shape, the latter producing a cure in a few days, whereas by the former it requires several shoeings and some months' time to remedy the complaint.

The part I claim as new and as my invention is—

That peculiar shape of the heel or the part turned upward into the foot, differing from anything I have ever known to be in use.

DANIEL $\overset{\text{his}}{\times}$ HOMER.
$\quad\quad\quad\quad$ mark.

Witnesses:
 GEO. W. LONG,
 WM. G. PINCKARD.